United States Patent
Gupta et al.

(10) Patent No.: US 11,328,017 B2
(45) Date of Patent: *May 10, 2022

(54) METHOD AND SYSTEM FOR GENERATING A CONVERSATIONAL AGENT BY AUTOMATIC PARAPHRASE GENERATION BASED ON MACHINE TRANSLATION

(71) Applicant: VERIZON PATENT AND LICENSING INC., Basking ridge, NJ (US)

(72) Inventors: Ankur Gupta, Cupertino, CA (US); Timothy Daly, San Jose, CA (US); Tularam Ban, Cupertino, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/570,348

(22) Filed: Sep. 13, 2019

(65) Prior Publication Data
US 2020/0004787 A1    Jan. 2, 2020

Related U.S. Application Data

(63) Continuation of application No. 15/667,283, filed on Aug. 2, 2017, now Pat. No. 10,423,665.

(51) Int. Cl.
*G06F 40/40* (2020.01)
*G06F 16/9032* (2019.01)
(Continued)

(52) U.S. Cl.
CPC ...... *G06F 16/90332* (2019.01); *G06F 40/205* (2020.01); *G06F 40/279* (2020.01);
(Continued)

(58) Field of Classification Search
CPC .... G06F 40/00–40/58; G06F 16/90332; G10L 15/30; G10L 17/22;
(Continued)

(56) References Cited

U.S. PATENT DOCUMENTS 8,548,805 B2    10/2013    Chotimongkol et al.
9,473,637 B1 *  10/2016    Venkatapathy ... G06F 16/90332
(Continued)

FOREIGN PATENT DOCUMENTS

CN    105320726 A    2/2016
CN    106663423 A    5/2017
(Continued)

OTHER PUBLICATIONS

Office Action dated May 29, 2019 in Taiwanese Patent Application 107125138.
(Continued)

*Primary Examiner* — Abul K Azad

(57) ABSTRACT

The present teaching relates to generating a conversational agent. In one example, a plurality of input utterances may be received from a developer. A paraphrase model is obtained. The paraphrase model is generated based on machine translation. For each of the plurality of input utterances, one or more paraphrases of the input utterance are generated based on the paraphrase model. For each of the plurality of input utterances, at least one of the one or more paraphrases is selected based on an instruction from the developer to generate selected paraphrases. The conversational agent is generated based on the plurality of input utterances and the selected paraphrases.

20 Claims, 14 Drawing Sheets

(51) Int. Cl.
  *G10L 17/22* (2013.01)
  *G10L 15/30* (2013.01)
  *G06N 3/00* (2006.01)
  *G06N 5/02* (2006.01)
  *G06F 40/35* (2020.01)
  *G06F 40/58* (2020.01)
  *G06F 40/205* (2020.01)
  *G06F 40/279* (2020.01)

(52) U.S. Cl.
  CPC .............. *G06F 40/35* (2020.01); *G06F 40/40* (2020.01); *G06F 40/58* (2020.01); *G06N 3/006* (2013.01); *G06N 5/025* (2013.01); *G10L 15/30* (2013.01); *G10L 17/22* (2013.01)

(58) Field of Classification Search
  CPC ... G10L 15/22–15/228; G10L 15/1815; G06N 3/006; G06N 5/025
  See application file for complete search history.

(56) References Cited

U.S. PATENT DOCUMENTS

| | | | | |
|---|---|---|---|---|
| 10,423,665 | B2* | 9/2019 | Gupta | G06F 16/90332 |
| 2004/0162724 | A1* | 8/2004 | Hill | G10L 15/1822 |
| | | | | 704/231 |
| 2007/0073532 | A1* | 3/2007 | Brockett | G06F 40/253 |
| | | | | 704/9 |
| 2011/0295589 | A1 | 12/2011 | Brockett et al. | |
| 2012/0109623 | A1* | 5/2012 | Dolan | G06F 40/45 |
| | | | | 704/2 |
| 2012/0191445 | A1* | 7/2012 | Markman | G06F 40/56 |
| | | | | 704/2 |
| 2013/0085756 | A1 | 4/2013 | Chotimongkol et al. | |
| 2015/0066479 | A1 | 3/2015 | Pasupalak et al. | |
| 2015/0348548 | A1 | 12/2015 | Piernot et al. | |
| 2016/0098986 | A1 | 4/2016 | Hofer et al. | |
| 2018/0061408 | A1* | 3/2018 | Andreas | G10L 15/063 |
| 2018/0068229 | A1 | 3/2018 | Srinivasan et al. | |
| 2018/0329883 | A1 | 11/2018 | Leidner et al. | |

FOREIGN PATENT DOCUMENTS

| | | |
|---|---|---|
| TW | 201610982 A | 3/2016 |
| TW | 201636996 A | 10/2016 |

OTHER PUBLICATIONS

Nakamura et al.; Generating human-like discussion by paraphrasing a translation by the AIWolf Protocol using Werewolf BBS Logs; 2017 IEEE International Conference on Fuzzy Systems (FUZZ—IEEE); p. 1-6. (Year: 2017).

Office Action dated Apr. 30, 2021 in Chinese Patent Application No. 201810864345.X.

Extended European Search Report dated May 26, 2021 in European Patent Application No. 18186915.7.

Elena Manishina et al: "Data-driven natural language generation using statistical machine translation and discriminative learning", Feb. 5, 2016, XP055534425, Retrieved from the Internet: URL:https://www.theses.fr/2016AVIG0209.pdf [retrieved on Dec. 14, 2018].

Jonathan Mallinson et al: "Paraphrasing Revisited with Neural Machine Translation", Proceedings of the 15th Conference of the European Chapter of the Association for Computational Linguistics: vol. 1, Long Papers, Apr. 3, 2017, pp. 881-893, XP055534407, Stroudsburg, PA, USA DOI: 10.18653/v1/E17-1083.

* cited by examiner

METHOD AND SYSTEM FOR GENERATING A CONVERSATIONAL AGENT BY AUTOMATIC PARAPHRASE GENERATION BASED ON MACHINE TRANSLATION

CROSS-REFERENCE TO RELATED APPLICATIONS

The present application is a continuation of U.S. patent application Ser. No. 15/667,283, filed Aug. 2, 2017, which is incorporated herein by reference in its entirety.

BACKGROUND

1. Technical Field

The present teaching relates to methods, systems, and programming for Internet services. Particularly, the present teaching is directed to methods, systems, and programming for generating a conversational agent by automatic paraphrase generation based on machine translation.

2. Discussion of Technical Background

The era of conversational agents has arrived: every major mobile operating system now comes with a conversational agent, which may be used to communicate with users. In addition, many businesses do not typically provide live chat customer support or service operators to assist their Internet customers. In such cases, a conversational agent, which may be an automated dialog bot or chatbot, might be used to communicate with customers. A chatbot may be a computer program designed to simulate an intelligent conversation with one or more human users via auditory or textual methods, for various practical purposes such as personalized service or information acquisition.

To build conversational agents, one of the key challenges is to have utterance training data for building and testing of the effectiveness of the agents/bots. In order to understand a user's spoken or typed commands, a bot/agent product uses a Natural Language Understanding (NLU) module to understand the user's command. In order to create such an NLU module, it is necessary to produce training data, which may include example utterances that are each labeled with their correct intent. For a product feature which users are already using, it is possible to gather real user interaction data as training data and label it. However, for a new product, or new product feature, there will be no real user interaction examples. Therefore, one must first create such utterance data, and then label it. This data creation process is time consuming and is a main bottleneck in extending an NLU model.

Therefore, there is a need to provide an improved solution for generating a conversational agent to solve the above-mentioned problems.

SUMMARY

The present teaching relates to methods, systems, and programming for Internet services. Particularly, the present teaching is directed to methods, systems, and programming for generating a conversational agent by automatic paraphrase generation based on machine translation.

In one example, a method, implemented on a machine having at least one processor, storage, and a communication platform capable of connecting to a network for generating a conversational agent is disclosed. A plurality of input utterances may be received from a developer. A paraphrase model is obtained. The paraphrase model is generated based on machine translation. For each of the plurality of input utterances, one or more paraphrases of the input utterance are generated based on the paraphrase model. For each of the plurality of input utterances, at least one of the one or more paraphrases is selected based on an instruction from the developer to generate selected paraphrases. The conversational agent is generated based on the plurality of input utterances and the selected paraphrases.

In a different example, a system having at least one processor, storage, and a communication platform capable of connecting to a network for generating a conversational agent is disclosed. The system comprises a paraphrase generator configured for receiving a plurality of input utterances from a developer, obtaining a paraphrase model that is generated based on machine translation, and generating, for each of the plurality of input utterances, one or more paraphrases of the input utterance based on the paraphrase model; a paraphrase data selector configured for selecting, for each of the plurality of input utterances, at least one of the one or more paraphrases based on an instruction from the developer to generate selected paraphrases; and a conversational agent generator configured for generating the conversational agent based on the plurality of input utterances and the selected paraphrases.

Other concepts relate to software for implementing the present teaching on generating a conversational agent. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for generating a conversational agent is disclosed. The information, when read by the machine, causes the machine to perform the following: receiving a plurality of input utterances from a developer; obtaining a paraphrase model that is generated based on machine translation; generating, for each of the plurality of input utterances, one or more paraphrases of the input utterance based on the paraphrase model; selecting, for each of the plurality of input utterances, at least one of the one or more paraphrases based on an instruction from the developer to generate selected paraphrases; and generating the conversational agent based on the plurality of input utterances and the selected paraphrases.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
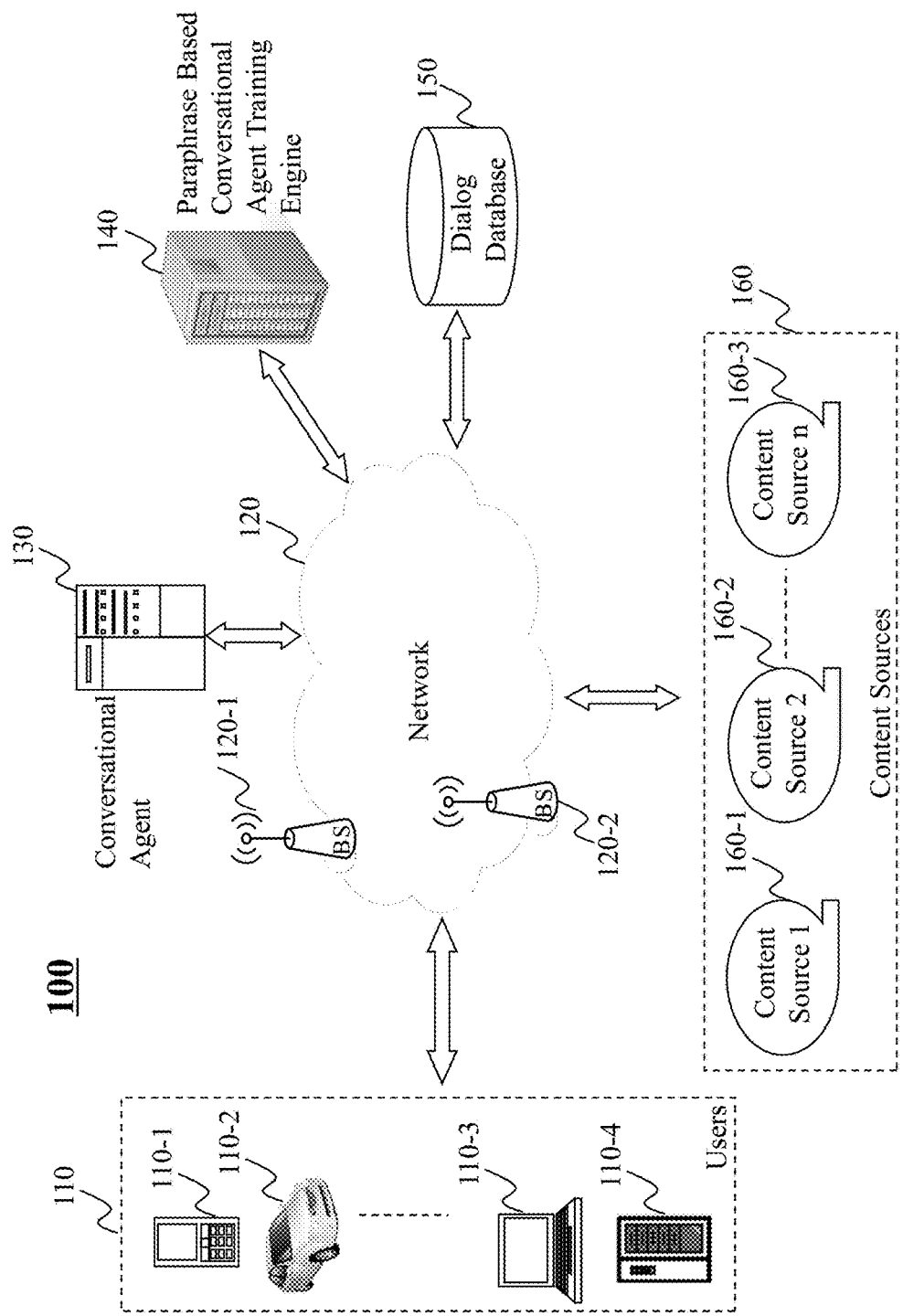
FIG. 1 is a high level depiction of an exemplary networked environment for generating a conversational agent by automatic paraphrase generation based on machine translation, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of generating a conversational agent by automatic paraphrase generation based on machine translation. The method and system as disclosed herein aim at efficient conversational agent generation by generating training data for building and training NLU models quickly.

To build conversational agents, one of the key challenges is to have utterance training data for building and testing of the effectiveness of the agents/bots. When first launching such an agent/bot product, or launching a new feature on such a product, it is necessary to add support to the Natural Language Understanding module, for the new features. This may be done by creating example utterances as part of a training data set. In order to understand a user's spoken or typed commands, a bot/agent product uses a NLU module to understand the user's command. This module may convert "utterances" that are in textual form of the user's natural language commands, into actionable data that can reflect user's "intent." In order to create such an NLU module, it is necessary to produce training data, which may include example utterances that are each labeled with their correct intent. For a product feature which users are already using, it is possible to gather real user interaction data as training data and label it. However, for a new product, or new product feature, there will be no real user interaction examples. Therefore, one must first create such utterance data, and then label it. This data creation process is time consuming and is a main bottleneck in extending an NLU model.

The terms "conversational agent", "agent", "bot" and "chatbot" may be used interchangeably herein.

The present teaching addresses this training data creation bottleneck using an automatic paraphrasing system. For each example utterance that a developer enters, the disclosed system can generate tens to hundreds of paraphrases, which may be semantically equivalent utterances using different words. These utterances are presented to the developer, who could merely select the most appropriate ones for adding to the model. It makes the training data generation process much easier and faster, and helps to ensure that a good diversity is present in the training data set, which improves model quality of the conversional agent.

In one embodiment, in a user interface that is used to create training data, when a new example utterance is entered by a bot/agent developer, the utterance is sent to a paraphrase generator. The paraphrase generator may use this utterance in combination with a paraphrase model, grammar rules, along with a diversity model, to produce paraphrases of the utterance. The paraphrases are returned to the bot developer via the user interface, where the bot developer can incorporate them into building of the NLU model by simply clicking a button.

According to various embodiments, a paraphrase generation system may be powered by paraphrase generation models along with a dictionary, grammar rules as well as diversity models. These paraphrase generation models may be created utilizing various machine learning and machine translation techniques along with training data, web crawled data and input data in the form of lexicon and phrase dictionary.

As such, the present teaching utilizes an automatic paraphrase generation system that helps a bot developer to create better and more complete/diverse training data with least effort. The disclosed system automatically generates semantically equivalent variations of a single example utterance, which the bot developer can directly use as training data. For example, given an input utterance of "I would like to book a flight", the paraphrase generation can generate following choices among hundreds of others: I wish to book a flight; I think book aircraft; I would like to book a plane; I would like to book an air; I'd like to book a flight; etc.

Accepting automatically generated paraphrases is significantly less work than creating them by hand. As such, an NLU model creation tool that offers such automatic paraphrasing as disclosed in the present teaching can provide a better return on investment than one that does not.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for generating a conversational agent by automatic paraphrase generation based on machine translation, according to an embodiment of the present teaching. In FIG. 1, the exemplary networked environment 100 includes one or more users 110, a network 120, a conversational agent 130, a paraphrase based conversational agent training engine 140, a dialog database 150, and content sources 160. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof. The network 120 may also include various network access points, e.g., wired or wireless access points such as base stations or Internet exchange points 120-1 . . . 120-2, through which a data source may connect to the network 120 in order to transmit information via the network 120.

Users 110 may be of different types such as users connected to the network 120 via desktop computers 110-4, laptop computers 110-3, a built-in device in a motor vehicle 110-2, or a mobile device 110-1. In one embodiment, users 110 may be connected to the network 120 and able to interact with the conversational agent 130 and the paraphrase based conversational agent training engine 140 through wired or wireless technologies and related operating systems implemented within user-wearable devices (e.g., glasses, wrist watch, etc.).

A user, e.g., the user 110-1, may communicate via the network 120 with the conversational agent 130 and the paraphrase based conversational agent training engine 140 through a user interface.

The conversational agent 130 may communicate with the user to enable efficient, natural task-oriented interactions with the user, e.g. by a guided dialog with the user to determine the user's requests and tasks and take corresponding task actions accordingly. An online dialog, also known as a chat session, may allow the user to receive answers to inquiries and receive information from the conversational agent 130. Based on a single input utterance from the user, the conversational agent 130 may determine multiple tasks estimated to be requested by the user via the single input utterance. The conversational agent 130 may store and access information stored in the dialog database 150 via the network 120. The information in the dialog database 150 may be generated by one or more different applications (not shown), which may be running on the conversational agent 130, at the backend of the conversational agent 130, or as a completely standalone system capable of connecting to the network 120, accessing information from different sources, analyzing the information, generating structured information, and storing such generated information in the dialog database 150.

The dialog database 150 may include various dialogs for the paraphrase based conversational agent training engine 140 to use for training a conversational agent. The dialogs may be generated based on real dialogs between users and human agents, and/or real dialogs between users and the conversational agent 130.

In one embodiment, the paraphrase based conversational agent training engine 140 may receive a plurality of input utterances from a developer for building a conversational agent. The paraphrase based conversational agent training engine 140 may obtain a paraphrase model that is generated based on machine translation. For example, after generating texts in an original language, translating the texts into other languages based on machine translation and translating the texts back into the original language based on machine translation, the paraphrase based conversational agent training engine 140 may generate machine translation based paraphrase data as training data for training the paraphrase model.

In one embodiment, the paraphrase based conversational agent training engine 140 may generate, for each of the plurality of input utterances, one or more paraphrases of the input utterance based on the paraphrase model. The paraphrase based conversational agent training engine 140 may select, for each of the plurality of input utterances, at least one of the one or more paraphrases based on an instruction from the developer to generate selected paraphrases, and generate the conversational agent based on the plurality of input utterances and the selected paraphrases.

The content sources 160 in the exemplary networked environment 100 include multiple content sources 160-1, 160-2 . . . 160-3. A content source 160 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The conversational agent 130 and the paraphrase based conversational agent training engine 140 may access information from any of the content sources 160-1, 160-2 . . . 160-3.

Figure 2:
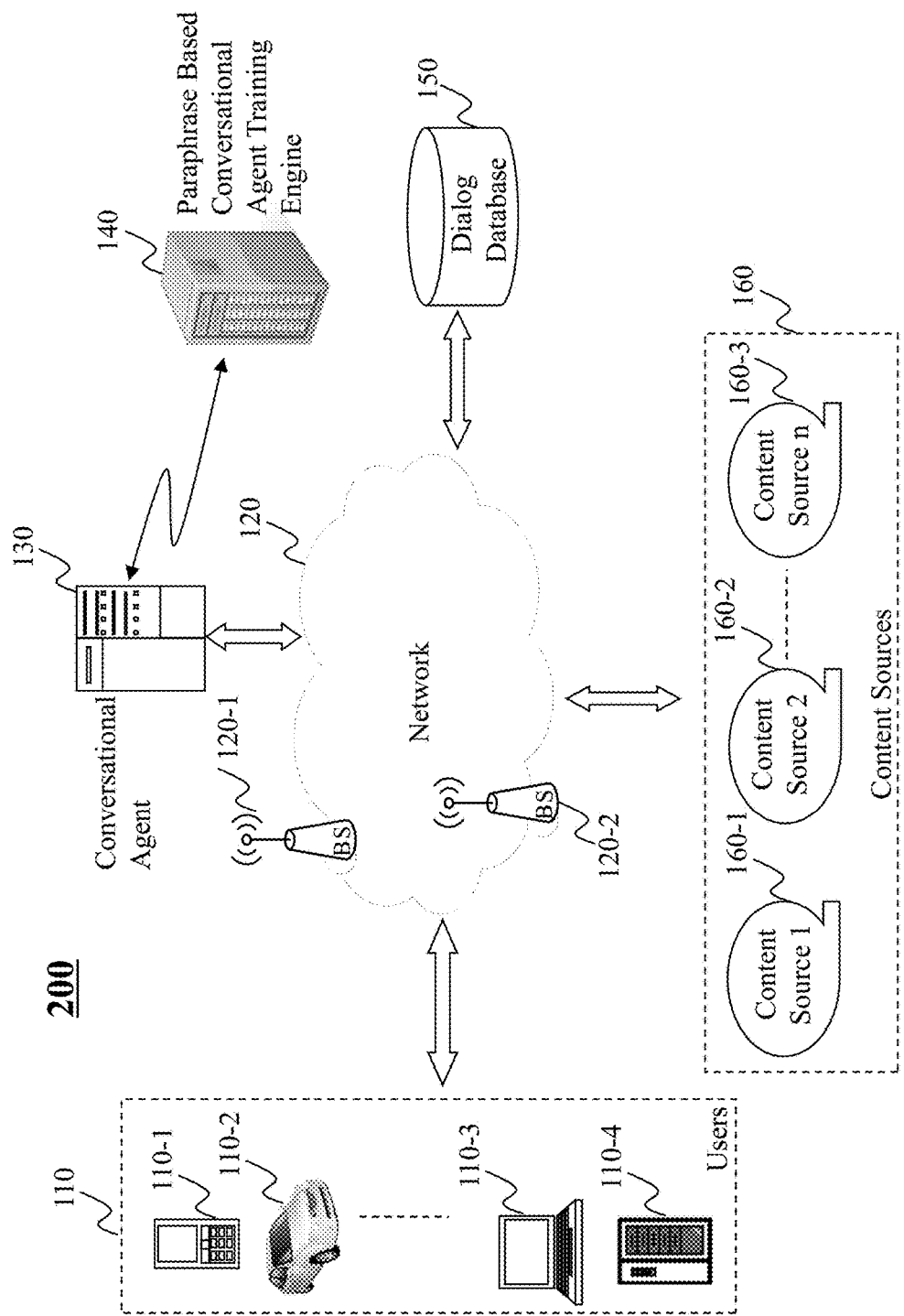
FIG. 2 is a high level depiction of another exemplary networked environment for generating a conversational agent by automatic paraphrase generation based on machine translation, according to an embodiment of the present teaching.

FIG. 2 is a high level depiction of another exemplary networked environment 200 for generating a conversational agent by automatic paraphrase generation based on machine translation, according to an embodiment of the present teaching. The exemplary networked environment 200 in this embodiment is similar to the exemplary networked environment 100 in FIG. 1, except that the paraphrase based conversational agent training engine 140 serves as a backend system for the conversational agent 130.

Figure 3:
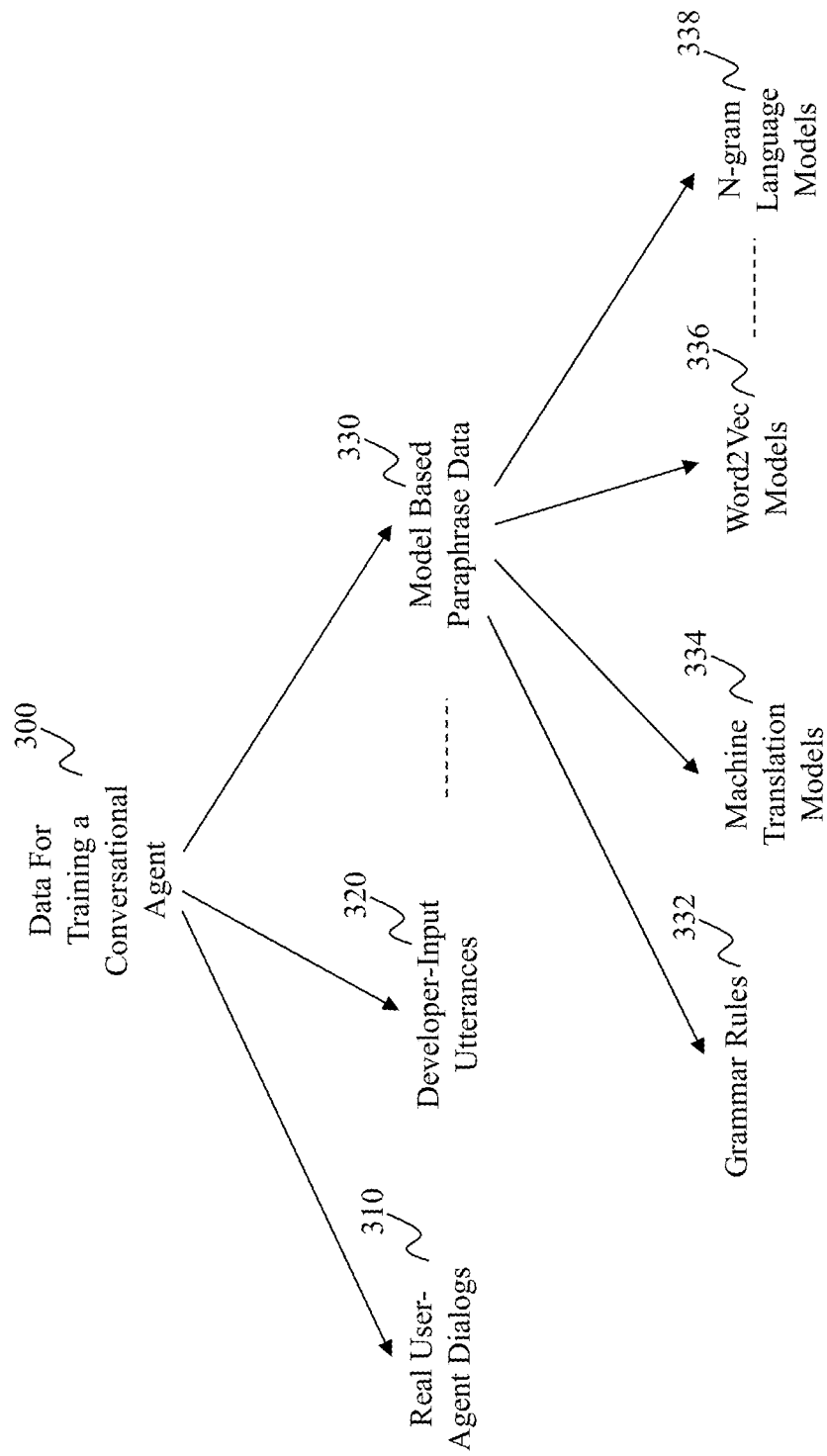
FIG. 3 illustrates various exemplary data for training or generating a conversational agent, according to an embodiment of the present teaching.

FIG. 3 illustrates various exemplary data for training or generating a conversational agent, according to an embodiment of the present teaching. As shown in FIG. 3, data 300 for training a conversational agent may comprise real user-agent dialogs 310, developer-input utterances 320, and model based paraphrase data 330. The model based paraphrase data 330 may be generated based on: grammar rules 332, machine translation models 334, Word2Vec models 336, and N-gram language models 338, etc.

Figure 4:
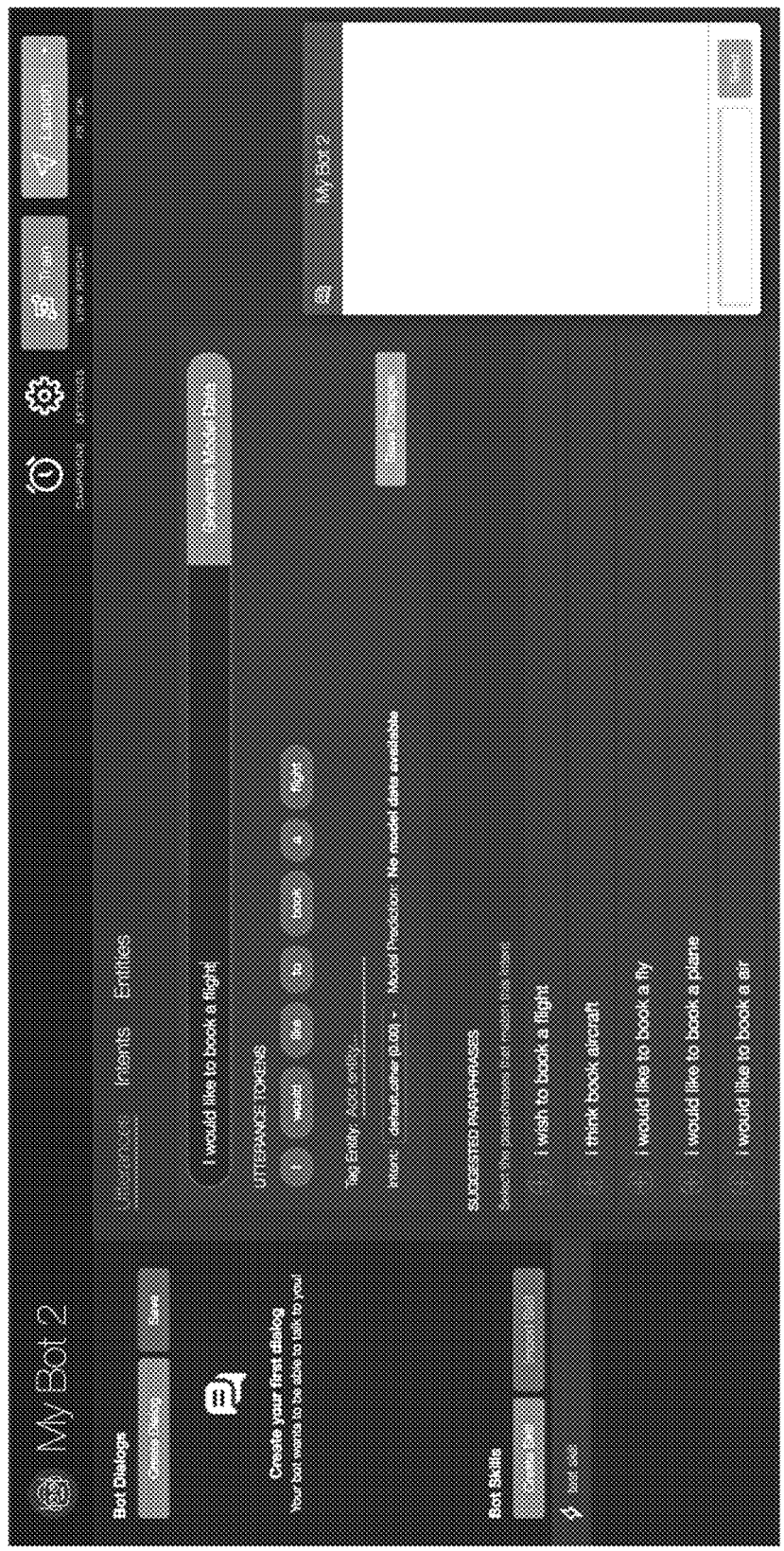
FIG. 4 illustrates an exemplary user interface with a developer for generating a conversational agent, according to an embodiment of the present teaching.

FIG. 4 illustrates an exemplary user interface with a developer for generating a conversational agent, according to an embodiment of the present teaching. As shown in FIG. 4, after a developer enters an utterance "I would like to book a flight," the disclosed system may generate a plurality of suggested paraphrases of the entered utterance, e.g. "I wish to book a flight," "I think book aircraft," "I would like to book a fly," "I would like to book a plane," "I would like to book a air," etc. Once these suggested paraphrases are presented to the developer, the developer may select one or more of the paraphrases that match the intent of the original utterance entered by the developer. In this manner, the developer can make use of the disclosed system to obtain lots of paraphrases generated automatically based on machine translation, can merely select from the suggested paraphrases, instead of entering the paraphrases one by one. In one embodiment, the developer can configure the disclosed system to directly select suggested paraphrases for the developer, e.g. based on top rated paraphrases or paraphrases having confidence scores higher than a threshold. These selected paraphrases, together with the originally entered utterances from the developer, can be utilized for training the conversational agent.

In the user interface (UI) shown in FIG. 4, a bot developer interacts with the bot building interface. In this UI, the developer enters one of the utterances, which is sent to the paraphrase based conversational agent training engine 140 to come up with hundreds of semantic equivalent paraphrases, which are displayed to the developer as "Suggested Paraphrases" for the developer to select them to train an NLU model.

Figure 5:
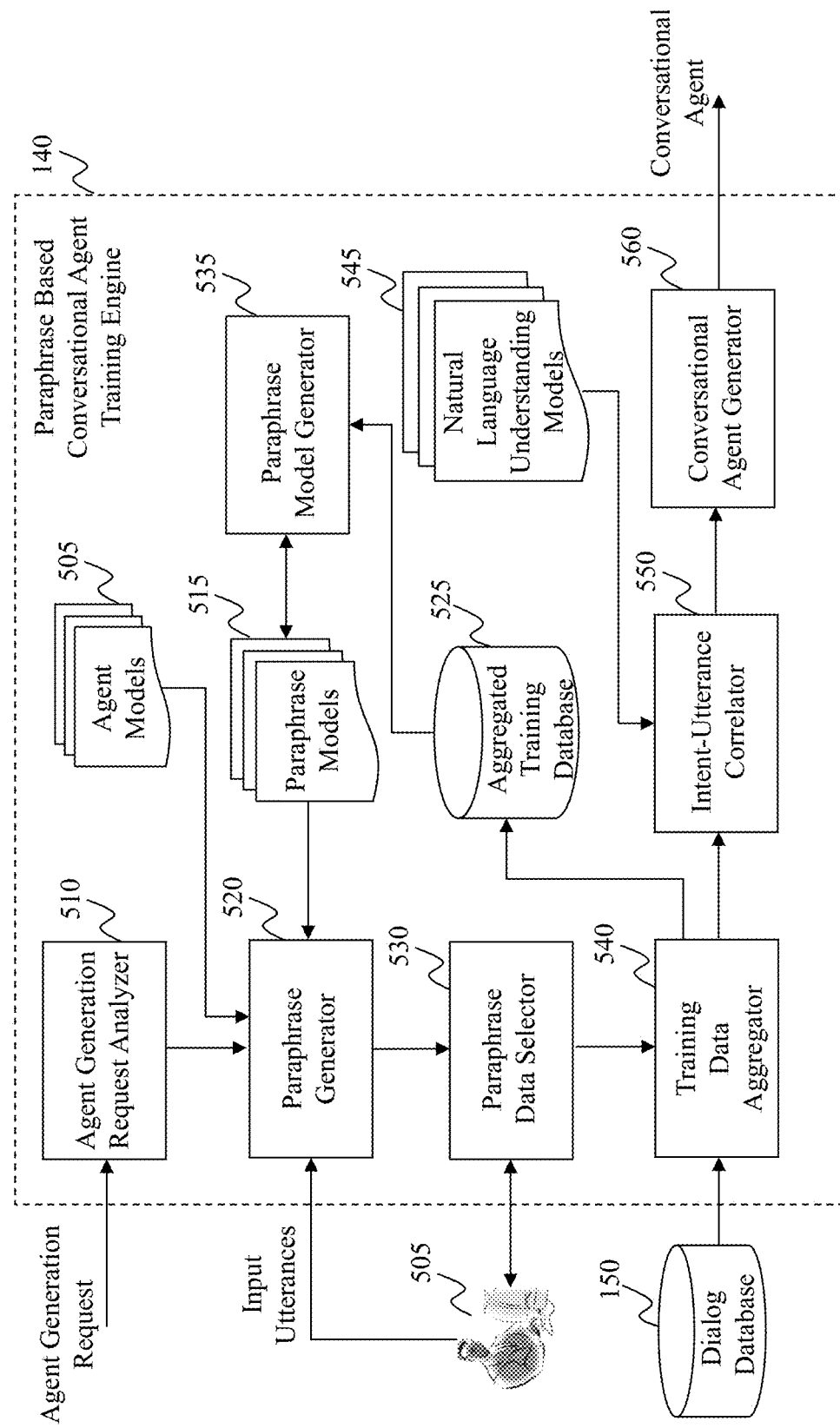
FIG. 5 illustrates an exemplary diagram of a paraphrase based conversational agent training engine, according to an embodiment of the present teaching.

FIG. 5 illustrates an exemplary diagram of a paraphrase based conversational agent training engine 140, according to an embodiment of the present teaching. As shown in FIG. 5, the paraphrase based conversational agent training engine 140 in this example includes an agent generation request analyzer 510, a paraphrase generator 520, one or more agent models 505, one or more paraphrase models 515, an aggregated training database 525, a paraphrase data selector 530, a paraphrase model generator 535, a training data aggregator 540, one or more natural language understanding models 545, an intent-utterance correlator 550, and a conversational agent generator 560.

The agent generation request analyzer 510 in this example may receive an agent generation request for generating a conversational agent. The request may come from a publisher (not shown), a developer 505, the conversational agent 130 (for re-training the agent), and/or a user directly. The agent generation request analyzer 510 may analyze the request to determine agent related information. The agent related information may include information related to the agent, e.g. domain of the agent, topic of the agent, information about the publisher who requested the agent, information about the users with whom the agent will have conversations, information about the developer who will develop the agent, etc. The agent generation request analyzer 510 can send the agent related information to the paraphrase generator 520 for generating paraphrases.

The paraphrase generator 520 in this example may receive the agent related information from the agent generation request analyzer 510, and identify the developer for whom the paraphrases will be generated. The paraphrase generator 520 may obtain input utterances from the developer. Based on the agent related information, the paraphrase generator 520 may select one of the agent models 505 for analyzing the input utterances. For example, for each input utterance, the paraphrase generator 520 may parse it and tokenize the parsed portions based on the selected agent model. The paraphrase generator 520 may retrieve one of the paraphrase models 515 and generate one or more paraphrases for each input utterance. In one embodiment, the retrieved paraphrase model may be generated based on machine translation, e.g. by the paraphrase model generator 535. The paraphrase generator 520 may send the generated paraphrases to the paraphrase data selector 530 for selection.

The paraphrase data selector 530 in this example may receive the generated paraphrases from the paraphrase generator 520 and select one or more of the generated paraphrases based on instruction from the developer 505. For example, the paraphrase data selector 530 may send the generated paraphrases to the developer 505 for review. As shown in FIG. 4, after being presented some suggested paraphrases, the developer 505 may select one or more of them by clicking on some corresponding buttons. Upon obtaining instructions from the developer 505, e.g. by receiving the clicking actions from the developer 505 via a user interface, the paraphrase data selector 530 may select one or more of the generated paraphrases. The paraphrase data selector 530 may then send paraphrase data related to the selected paraphrases to the training data aggregator 540 for generating aggregated training data.

The training data aggregator 540 in this example may receive the paraphrase data from the paraphrase data selector 530. The training data aggregator 540 may also retrieve real dialogs stored in the dialog database 150. In one case, the real dialogs retrieved may be past dialogs between users and a conversational agent that has a same or similar domain as the conversation agent to be generated. In another case, the real dialogs retrieved may be past dialogs between users and a conversational agent that was generated for a same or similar publisher as the conversation agent to be generated, or was generated for a same or similar developer as the conversation agent to be generated. In yet another case, the real dialogs retrieved may be past dialogs between a conversational agent and users that are same or similar to users with whom the conversation agent to be generated will have conversations. Based on the paraphrase data and/or the retrieved real dialogs, the training data aggregator 540 may generate aggregated training data for training a paraphrase model. The training data aggregator 540 may store the aggregated training data into the aggregated training database 525.

It can be understood that, in one embodiment, when no real dialogs related to the conversation agent is available in the dialog database 150, the training data aggregator 540 can generate aggregated training data just based on the paraphrase data from the paraphrase data selector 530. The training data aggregator 540 may send the aggregated training data to the intent-utterance correlator 550 for generating intent-utterance correlations.

The intent-utterance correlator 550 in this example may receive the aggregated training data from the training data aggregator 540 and obtain one of the natural language understanding (NLU) models 545. Based on the NLU model and the aggregated training data, the intent-utterance correlator 550 may generate intent-utterance correlations between input utterances and user intent, such that once the conversational agent receive an input utterance from a user, the conversational agent can understand the user intent of the user corresponding to the input utterance. The intent-utterance correlator 550 may send the generated intent-utterance correlations to the conversational agent generator 560 for generating the conversational agent.

The conversational agent generator 560 in this example may receive the generated intent-utterance correlations from the intent-utterance correlator 550 and generate the conversational agent based on the intent-utterance correlations. It can be understood that the conversational agent is generated based on information about the domain, the developer/publisher, and other metadata related to the agent as well.

The conversational agent generator 560 may send the generated conservational agent to the requester in response to the agent generation request.

The paraphrase model generator 535 in this example may retrieve the aggregated training data stored in the aggregated training database 525 and generate or update a paraphrase model based on the aggregated training data. For example, the paraphrase model generator 535 may re-train a paraphrase model based on the aggregated training data and machine translation techniques.

Figure 6:
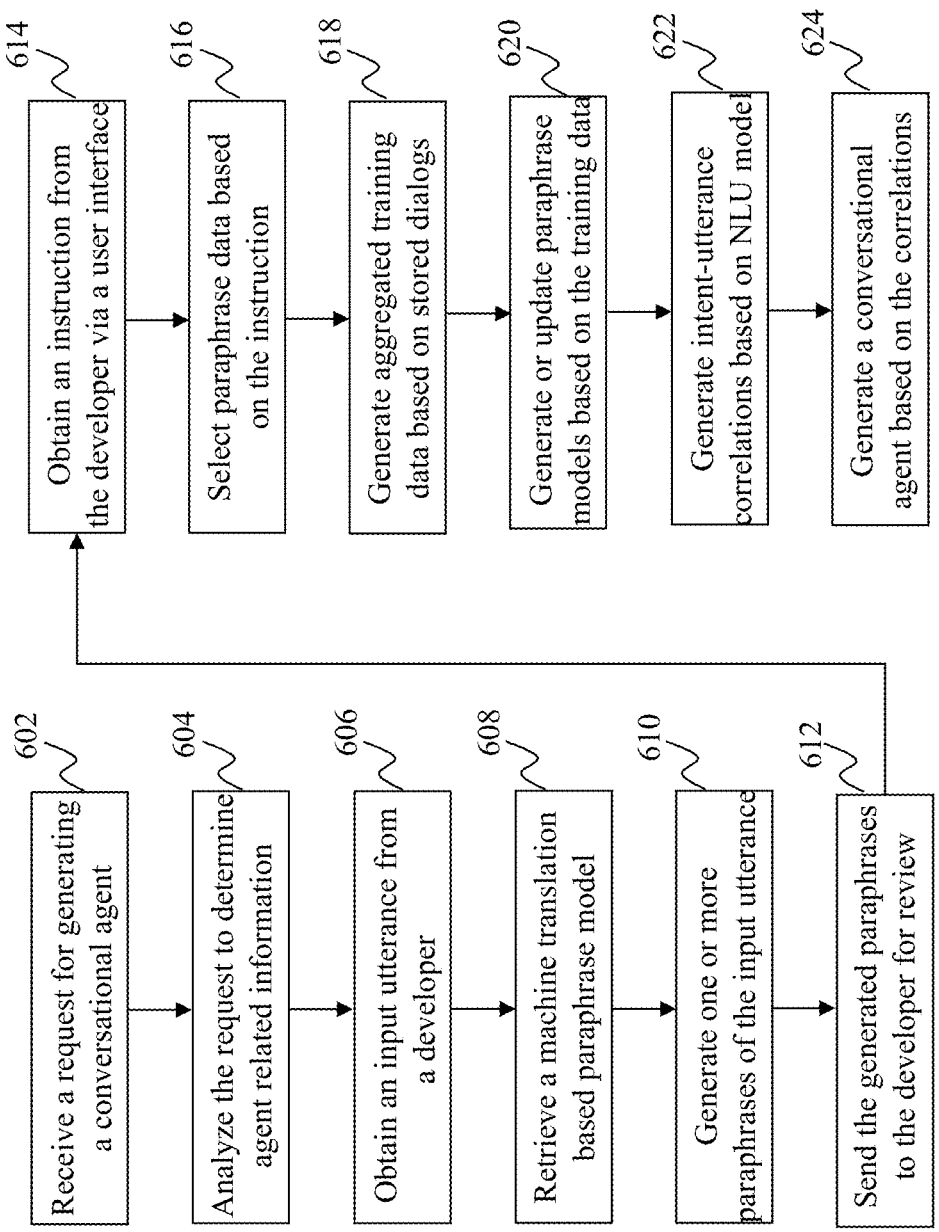
FIG. 6 is a flowchart of an exemplary process performed by a paraphrase based conversational agent training engine, according to an embodiment of the present teaching.

FIG. 6 is a flowchart of an exemplary process performed by a paraphrase based conversational agent training engine, e.g. the paraphrase based conversational agent training engine 140 in FIG. 5, according to an embodiment of the present teaching. A request for generating a conversational agent is received at 602. The request is analyzed at 604 to determine agent related information. An input utterance from a developer is obtained at 606. A machine translation based paraphrase model is retrieved at 608. One or more paraphrases of the input utterance are generated at 610, e.g. based on the machine translation based paraphrase model. The generated paraphrases are sent at 612 to the developer for review.

An instruction is obtained at 614 from the developer via a user interface. Paraphrase data are selected at 616 based on the instruction. Aggregated training data are generated at 618 based on stored dialogs. One or more paraphrase models are generated or updated at 620 based on the training data. Intent-utterance correlations are generated at 622 based on an NLU model. A conversational agent is generated at 624 based on the correlations.

Figure 7:
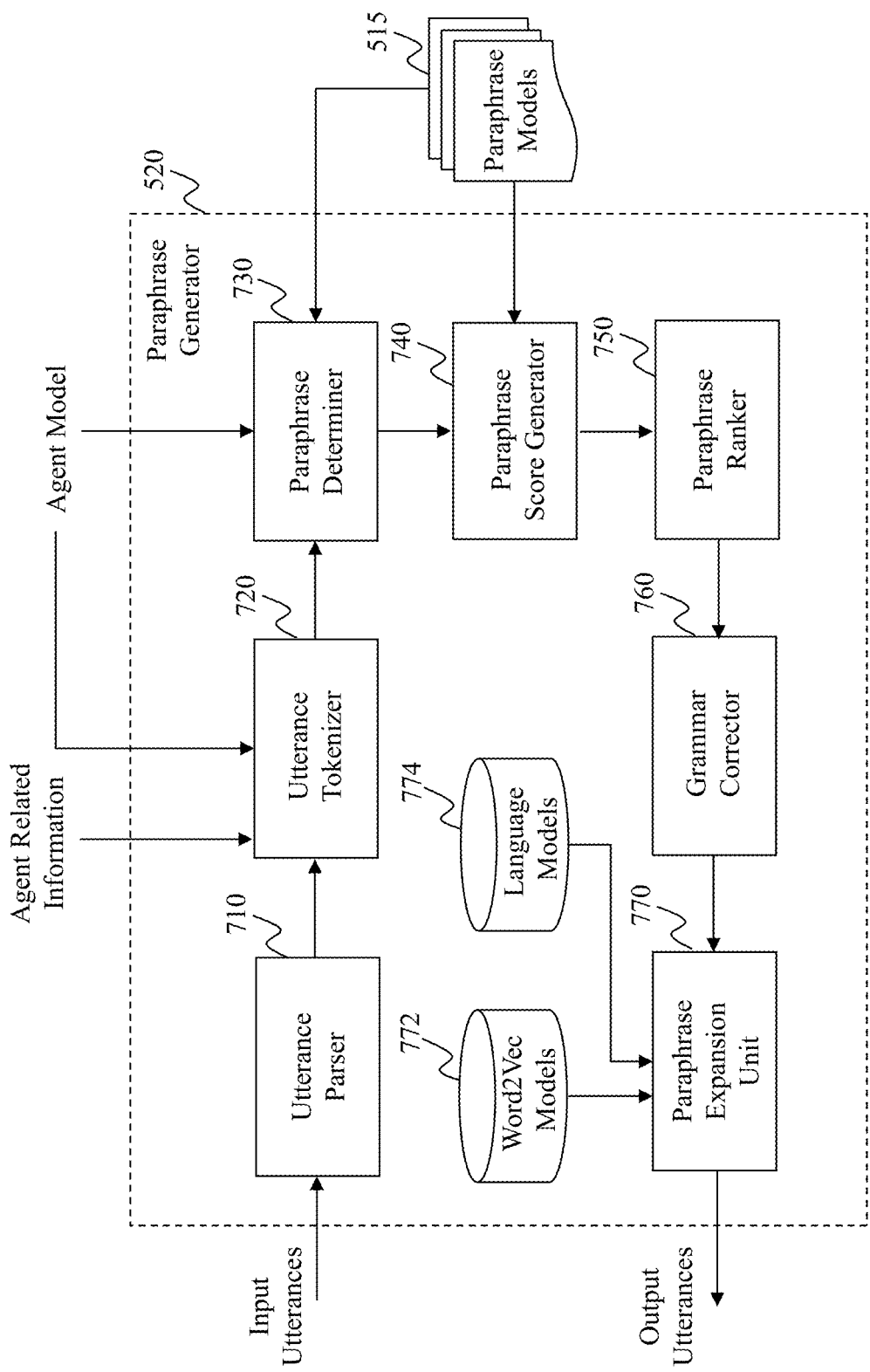
FIG. 7 illustrates an exemplary diagram of a paraphrase generator, according to an embodiment of the present teaching.

FIG. 7 illustrates an exemplary diagram of a paraphrase generator 520, according to an embodiment of the present teaching. As shown in FIG. 7, the paraphrase generator 520 in this example includes an utterance parser 710, an utterance tokenizer 720, a paraphrase determiner 730, a paraphrase score generator 740, a paraphrase ranker 750, a grammar corrector 760, a paraphrase expansion unit 770, one or more stored Word2Vec models, and one or more stored language models.

The utterance parser 710 in this example may obtain an input utterance from a developer and parse the utterance into multiple portions. The utterance parser 710 may send the parsed portions to the utterance tokenizer 720 for tokenizing the portions.

The utterance tokenizer 720 in this example may receive the parsed portions from the utterance parser 710. The utterance tokenizer 720 may also receive agent related information from the agent generation request analyzer 510 and select an agent model based on the agent related information. Based on the selected agent model and the parsed portions, the utterance tokenizer 720 can tokenize each parsed input utterance portion for paraphrase generation. The utterance tokenizer 720 may then send the tokenized portions to the paraphrase determiner 730 for determining paraphrases.

The paraphrase determiner 730 in this example may receive the tokenized portions from the utterance tokenizer 720 and obtain the selected agent model. The paraphrase determiner 730 may also retrieve a paraphrase model, e.g. a machine translation based paraphrase model. Based on the retrieved paraphrase model, the paraphrase determiner 730 can determine one or more paraphrases for each input utterance. The paraphrase determiner 730 may send the determined paraphrases to the paraphrase score generator 740 for generating confidence scores.

The paraphrase score generator 740 in this example may receive the determined paraphrases from the paraphrase determiner 730 and obtain the paraphrase model. Based on the paraphrase model, the paraphrase score generator 740 can generate a confidence score for each paraphrase, where the confidence score can indicate how confident that this paraphrase has a same user intent as the input utterance. The paraphrase score generator 740 may send the paraphrases and their confidence scores to the paraphrase ranker 750 for ranking.

The paraphrase ranker 750 in this example may receive the paraphrases and their confidence scores from the paraphrase score generator 740, and rank the paraphrases based on their respective confidence scores. As such, the paraphrase ranker 750 can generate a ranked list of paraphrases and send the ranked list to the grammar corrector 760 for grammar correction.

The grammar corrector 760 in this example may correct grammar errors, if any, in the ranked paraphrases, and then send the corrected paraphrases to the paraphrase expansion unit 770. The paraphrase expansion unit 770 in this example may expand the ranked paraphrases based on some diversity model, e.g. a Word2Vec model, a language model, etc. After expansion, the ranked paraphrases will include more variations than the determined paraphrases by the paraphrase determiner 730. The paraphrase expansion unit 770 may output the expanded and ranked paraphrases, e.g. to the paraphrase data selector 530 for paraphrase selection based on developer instructions.

Figure 8:
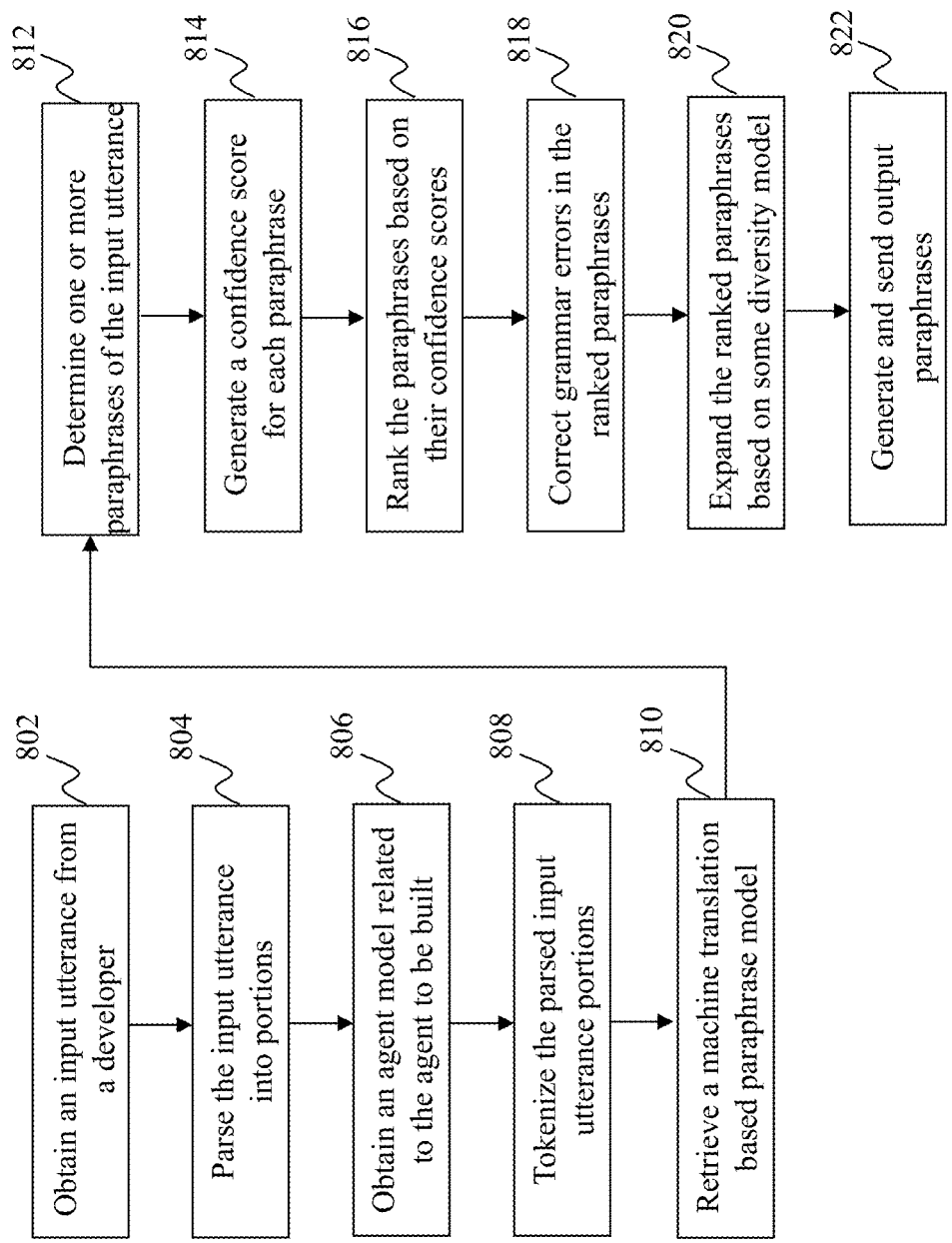
FIG. 8 is a flowchart of an exemplary process performed by a paraphrase generator, according to an embodiment of the present teaching.

FIG. 8 is a flowchart of an exemplary process performed by a paraphrase generator, e.g. the paraphrase generator 520 in FIG. 7, according to an embodiment of the present teaching. An input utterance is obtained at 802 from a developer. The input utterance is parsed at 804 into portions. At 806, an agent model related to the agent to be built is obtained. The parsed input utterance portions are tokenized at 808. At 810, a machine translation based paraphrase model is retrieved.

One or more paraphrases of the input utterance are determined at 812. A confidence score is generated at 814 for each paraphrase. The paraphrases are ranked at 816 based on their confidence scores. Grammar errors in the ranked paraphrases are corrected at 818. The ranked paraphrases are expanded at 820 based on some diversity model. Output paraphrases are generated and sent at 822 for selection.

Figure 9:
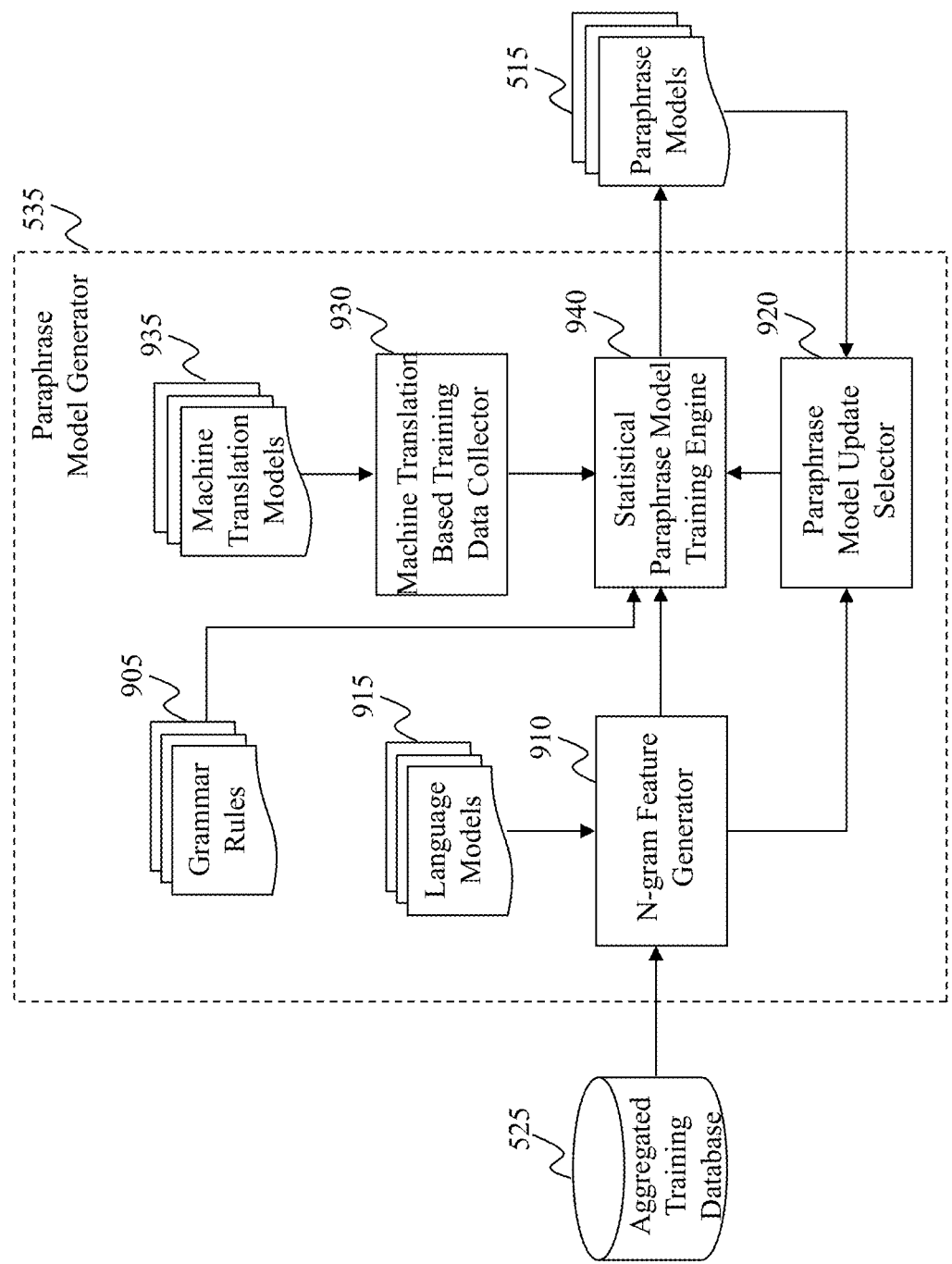
FIG. 9 illustrates an exemplary diagram of a paraphrase model generator, according to an embodiment of the present teaching.

FIG. 9 illustrates an exemplary diagram of a paraphrase model generator 535, according to an embodiment of the present teaching. As shown in FIG. 9, the paraphrase model generator 535 in this example includes an N-gram feature generator 910, one or more stored language models 915, a paraphrase model update selector 920, one or more stored grammar rules 905, a machine translation based training data collector 930, one or more stored machine translation models 935, and a statistical paraphrase model training engine 940.

The N-gram feature generator 910 in this example may obtain aggregated training data from the aggregated training database 525, and select one of the language models 915. Based on the selected language model, the N-gram feature generator 910 may generate N-gram features from the aggregated training data, e.g. features related to 2-gram, 3-gram generated from the training data. The N-gram feature generator 910 may send the N-gram features to the paraphrase model update selector 920 for selecting a paraphrase model to update.

The paraphrase model update selector 920 in this example may receive the N-gram features from the N-gram feature generator 910, and select one or more of the paraphrase models 515 for update. For example, the paraphrase model update selector 920 may select a paraphrase model for update, when N-gram features from the training data indicate that many new training data related to the paraphrase model are available, and/or the paraphrase model has not been re-trained for a long time. The paraphrase model update selector 920 may retrieve the selected paraphrase model and send it to the statistical paraphrase model training engine 940 for re-training. It can be understood that in one embodiment, the paraphrase model update selector 920 may determine to generate a new paraphrase model, e.g. when many training data are not related to any of the paraphrase models 515. Then, the paraphrase model update selector 920 may inform the statistical paraphrase model training engine 940 to generate a new paraphrase model accordingly.

The statistical paraphrase model training engine 940 in this example may receive the selected paraphrase model or receive an instruction to generate a new paraphrase model from the paraphrase model update selector 920, and receive the N-gram features of training data for re-training or generating the paraphrase model. In one embodiment, the statistical paraphrase model training engine 940 may also obtain some grammar rules for training the paraphrase model. In another embodiment, the statistical paraphrase model training engine 940 may obtain more training data that are collected by the machine translation based training data collector 930 based on a machine translation model.

The machine translation based training data collector 930 in this example may collect more training data based on one or more machine translation models 935. For example, based on a machine translation model, the machine translation based training data collector 930 may translate a text from a first language to a second language and then translate it back, such that more paraphrases can be generated as training data for training the paraphrase model. Different machine translation models may have different translation schemes, correspond to different languages, and/or have different translation speed, thresholds, etc. In one embodiment, the machine translation based training data collector 930 may select the machine translation model based on the paraphrase model to be trained. The machine translation based training data collector 930 may send the collected training data based on machine translation to the statistical paraphrase model training engine 940 for training the paraphrase model.

The statistical paraphrase model training engine 940 in this example may then train the paraphrase model based on the training data obtained from the N-gram feature generator 910 and the machine translation based training data collector 930, and based on the grammar rules 905. After training, the statistical paraphrase model training engine 940 can store the trained paraphrase model for future paraphrase generation during conversational agent generation.

Figure 10:
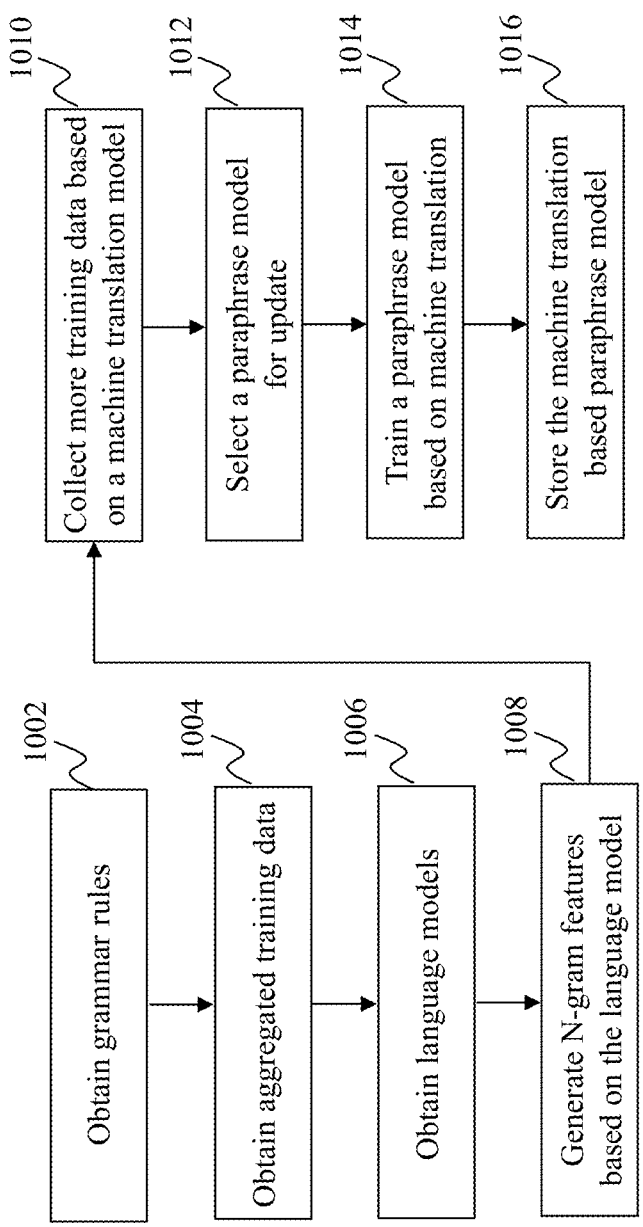
FIG. 10 is a flowchart of an exemplary process performed by a paraphrase model generator, according to an embodiment of the present teaching.

FIG. 10 is a flowchart of an exemplary process performed by a paraphrase model generator, e.g. the paraphrase model generator 535 in FIG. 9, according to an embodiment of the present teaching. Grammar rules are obtained at 1002. Aggregated training data are obtained at 1004. Language models are obtained at 1006. At 1008, N-gram features are generated from the aggregated training data based on the language models.

More training data are collected at 1010 based on a machine translation model. A paraphrase model is selected at 1012 for update. At 1014, a paraphrase model is trained based on machine translation. The machine translation based paraphrase model is stored at 1016.

Figure 11:
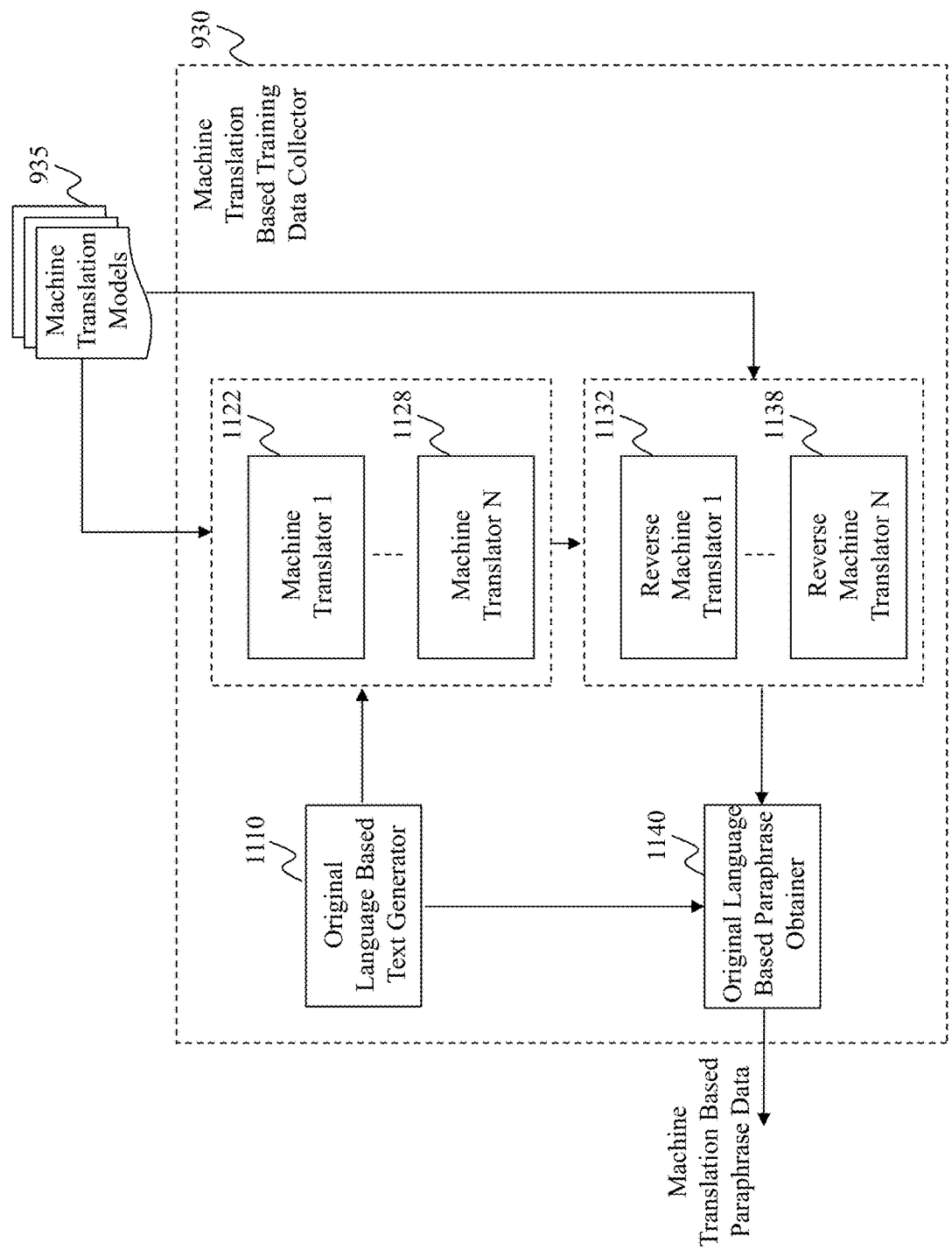
FIG. 11 illustrates an exemplary diagram of a machine translation based training data collector, according to an embodiment of the present teaching.

FIG. 11 illustrates an exemplary diagram of a machine translation based training data collector 930, according to an embodiment of the present teaching. As shown in FIG. 11, the machine translation based training data collector 930 in this example includes an original language based text generator 1110, N machine translators 1122, 1128, N reverse machine translators 1132, 1138, and an original language based paraphrase obtainer 1140.

The original language based text generator 1110 in this example may generate texts in an original language. The original language may be predetermined by an administrator, or be dynamically determined based on a conversational agent to be built. The original language based text generator 1110 may generate various texts in different topics according to the conversational agent to be built and/or according to the paraphrase model to be trained. The original language based text generator 1110 may send the generated texts to the N machine translators 1122, 1128 for machine translation. The original language based text generator 1110 may also send the generated texts to the original language based paraphrase obtainer 1140 for generating paraphrases.

Each of the N machine translators 1122, 1128 in this example may receive the generated texts in the original language from the original language based text generator 1110 and translate them into a different language based on machine translation, without human inputs. For example, the machine translator 1 1122 may translate texts from the original language to a first language based on machine translation according to a first machine translation model; while the machine translator N 1128 may translate texts from the original language to a second language based on machine translation according to a second machine translation model. It can be understood that N may be one in some embodiments. It can also be understood that some of the N machine translators may translate the texts into a same language. After the machine translation, each of the N machine translators 1122, 1128 may send the translated texts to the N reverse machine translators 1132, 1138 for reserve translation.

Each of the N reverse machine translators 1132, 1138 in this example may receive translated texts in a translated language from a corresponding machine translator, and can translate back the translated texts from the translated language to the original language based on a machine translation model. For example, the reverse machine translator 1 1132 may receive the translated texts from the machine translator 1 1122 and translate back the translated texts into the original language based on machine translation; while the reverse machine translator N 1138 may receive the translated texts from the machine translator N 1128 and translate back the translated texts into the original language based on machine translation. After the reverse machine translation, each of the N reverse machine translators 1132, 1138 may send the reverse-translated texts to the original language based paraphrase obtainer 1140 for paraphrase generation.

The original language based paraphrase obtainer 1140 in this example may receive the texts being translated back from the N reverse machine translators 1132, 1138. The original language based paraphrase obtainer 1140 may also receive the original texts in the original language from the original language based text generator 1110. It can be understood that, after a text is translated to another language and is then translated back to the original language, the result text may be different from the original text before translation, but can be a paraphrase of the original text. As such, the original language based paraphrase obtainer 1140 may obtain paraphrases for each original text in original language generated by the original language based text generator 1110. The original language based paraphrase obtainer 1140 may filter the machine translation based paraphrase data and send them to the statistical paraphrase model training engine 940 as more training data for training the paraphrase model.

Figure 12:
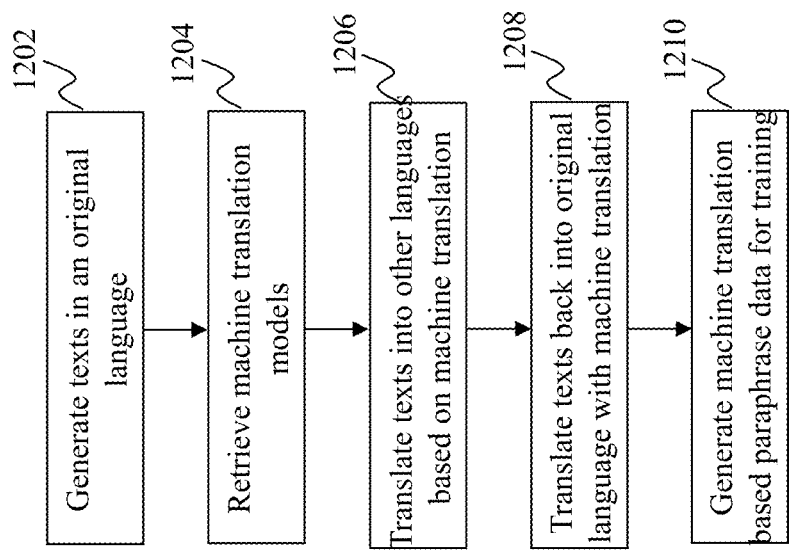
FIG. 12 is a flowchart of an exemplary process performed by a machine translation based training data collector, according to an embodiment of the present teaching.

FIG. 12 is a flowchart of an exemplary process performed by a machine translation based training data collector, e.g., the machine translation based training data collector 930 in FIG. 11, according to an embodiment of the present teaching. Texts in an original language are generated at 1202. Machine translation models are retrieved at 1204. The texts are translated at 1206 into other languages based on machine translation. At 1208, the texts are translated back into the original language with machine translation. Machine translation based paraphrase data are generated at 1210 for training a paraphrase model that will be used to generate a conversational agent.

It can be understood that the order of the steps shown in FIGS. 6, 8, 10, and 12 may be changed according to different embodiments of the present teaching.

Figure 13:
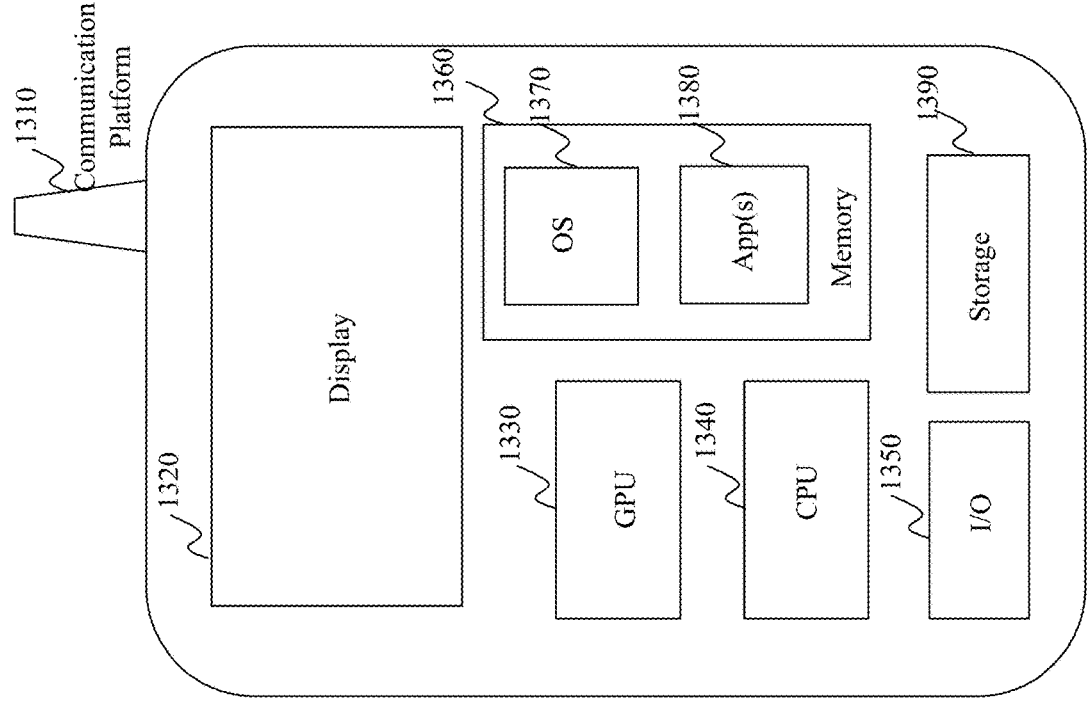
FIG. 13 depicts the architecture of a mobile device which can be used to implement a specialized system incorporating the present teaching.

FIG. 13 depicts the architecture of a mobile device which can be used to realize a specialized system implementing the present teaching. In this example, the user device on which a user interface for a dialog with a conversational agent is presented and interacted-with is a mobile device 1300, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1300 in this example includes one or more central processing units (CPUs) 1340, one or more graphic processing units (GPUs) 1330, a display 1320, a memory 1360, a communication platform 1310, such as a wireless communication module, storage 1390, and one or more input/output (I/O) devices 1350. Any other suitable component, including but not limited to a system bus or a controller (not shown), may also be included in the mobile device 1300. As shown in FIG. 13, a mobile operating system 1370, e.g., iOS, Android, Windows Phone, etc., and one or more applications 1380 may be loaded into the memory 1360 from the storage 1390 in order to be executed by the CPU 1340. The applications 1380 may include a browser or any other suitable mobile apps for receiving dialog responses from the conversational agent on the mobile device 1300. User interactions with the conversational agent may be achieved via the I/O devices 1350 and provided to the paraphrase based conversational agent training engine 140 and/or other components of systems 100 and 200, e.g., via the network 120.

To implement various modules, units, and their functionalities described in the present disclosure, computer hardware platforms may be used as the hardware platform(s) for one or more of the elements described herein (e.g., the paraphrase based conversational agent training engine 140, the conversational agent 130 and/or other components of systems 100 and 200 described with respect to FIGS. 1-12). The hardware elements, operating systems and programming languages of such computers are conventional in nature, and it is presumed that those skilled in the art are adequately familiar therewith to adapt those technologies about generating a conversational agent by automatic paraphrase generation based on machine translation as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 14:
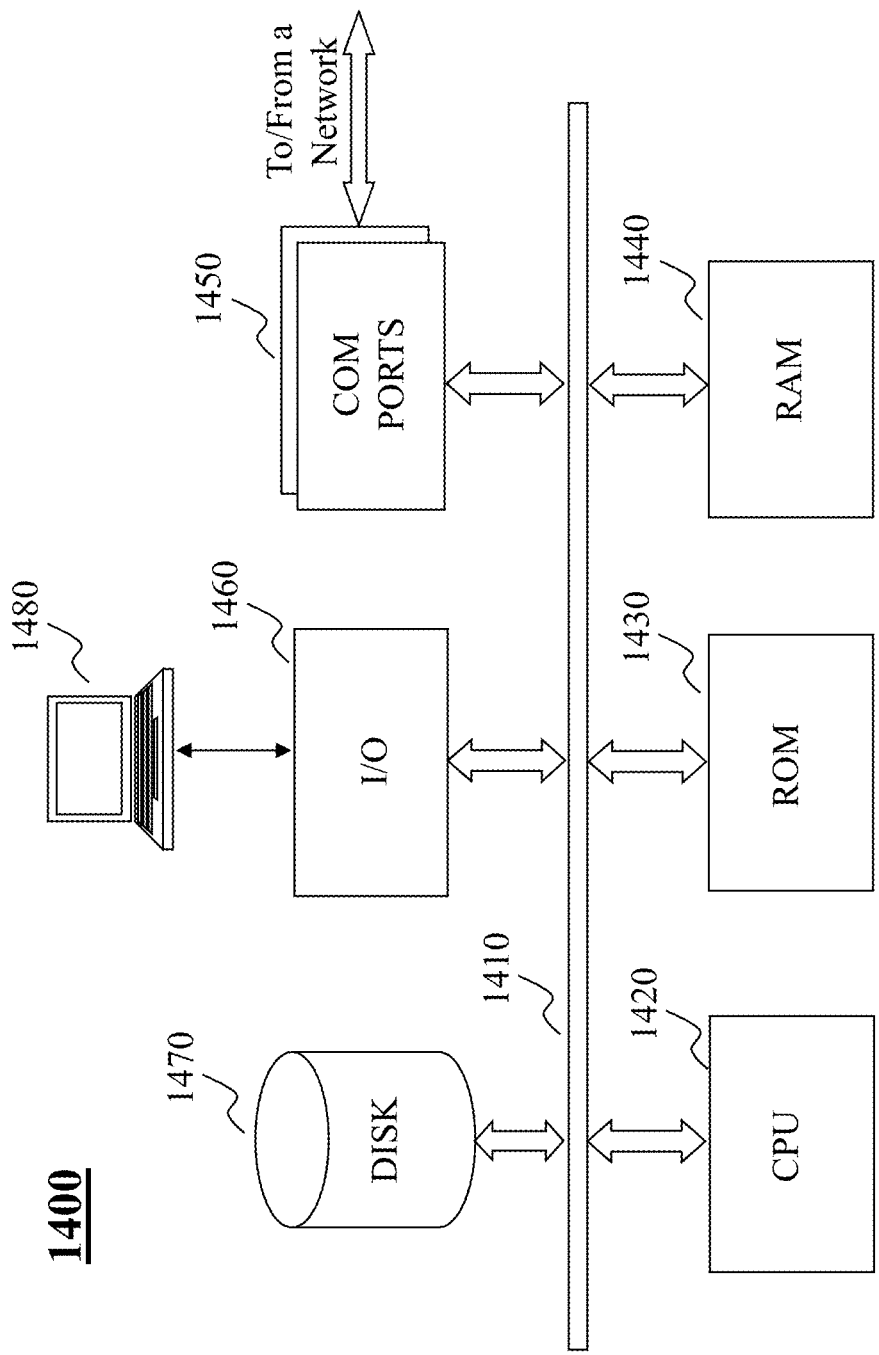
FIG. 14 depicts the architecture of a computer which can be used to implement a specialized system incorporating the present teaching.

FIG. 14 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1400 may be used to implement any component of the techniques of generating a conversational agent by automatic paraphrase generation based on machine translation, as described herein. For example, the conversational agent 130, the paraphrase based conversational agent training engine 140, etc., may be implemented on a computer such as computer 1400, via its hardware, software program, firmware, or a combination thereof. Although only one such computer is shown, for convenience, the computer functions relating to generating a conversational agent by automatic paraphrase generation based on machine translation as described herein may be implemented in a distributed fashion on a number of similar platforms, to distribute the processing load.

The computer 1400, for example, includes COM ports 1450 connected to and from a network connected thereto to facilitate data communications. The computer 1400 also includes a central processing unit (CPU) 1420, in the form of one or more processors, for executing program instructions. The exemplary computer platform includes an internal communication bus 1410, program storage and data storage of different forms, e.g., disk 1470, read only memory (ROM) 1430, or random access memory (RAM) 1440, for various data files to be processed and/or communicated by the computer, as well as possibly program instructions to be executed by the CPU. The computer 1400 also includes an I/O component 1460, supporting input/output flows between the computer and other components therein such as user interface elements 1480. The computer 1400 may also receive programming and data via network communications.

Hence, aspects of the methods of generating a conversational agent by automatic paraphrase generation based on machine translation, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with generating a conversational agent by automatic paraphrase generation based on machine translation. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, generating a conversational agent by automatic paraphrase generation based on machine translation as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for generating a conversational agent, the method comprising:
obtaining, based on a paraphrase model, one or more paraphrases for each of a plurality of input utterances, wherein the paraphrase model is trained to obtain the one or more paraphrases via machine translation of the plurality of input utterances;
selecting at least one of the one or more paraphrases for each input utterance to generate selected paraphrases, wherein the selecting is based on:
a user instruction of selecting the at least the one of the one or more paraphrases, and
an intent of the input utterance; and
generating a conversational agent based on the plurality of input utterances and the selected paraphrases.

2. The method of claim 1, further comprising:
obtaining aggregated training data based on stored user-agent dialogs, the at least one of the one or more paraphrases, or the stored user-agent dialogs and the at least one of the one or more paraphrases, wherein the paraphrase model is trained using the aggregated training data.

3. The method of claim 2, further comprising:
selecting, based on the aggregated training data, the paraphrase model from a plurality of paraphrase models.

4. The method of claim 3, wherein a plurality of N-grams features are generated from the aggregated training data, selecting the paraphrase model comprises:
determining, based on the plurality of N-grams features, that the aggregated training data comprises new training data related to the paraphrase model, wherein the paraphrase model is updated based on the aggregated training data.

5. The method of claim 2, further comprising:
generating a plurality of N-grams from the aggregated training data;
determining, based on the plurality of N-grams, that the aggregated training data is unrelated to any previously generated paraphrase model; and
generating the paraphrase model based on the aggregated training data.

6. The method of claim 1, wherein the at least one of the one or more paraphrases selected is semantically equivalent to a corresponding input utterance.

7. The method of claim 1, further comprising:
training, prior to the one or more paraphrases being obtained, the paraphrase model using training data, wherein the training data is obtained by:
generating texts in a first language,
translating the texts into one or more second languages based on machine translation to obtain translated texts,
translating each of the translated texts from the one or more second languages to the first language to obtain re-translated texts, and
generating the training data based on the texts in the first language and the re-translated texts.

8. A non-transitory machine-readable medium having information recorded thereon for generating a conversational agent, wherein the information, when read by the machine, effectuate operations comprising:
obtaining, based on a paraphrase model, one or more paraphrases for each of a plurality of input utterances, wherein the paraphrase model is trained to obtain the one or more paraphrases via machine translation of the plurality of input utterances;

selecting at least one of the one or more paraphrases for each input utterance to generate selected paraphrases, wherein the selecting is based on:
  a user instruction of selecting the at least the one of the one or more paraphrases, and
  an intent of the input utterance; and
generating a conversational agent based on the plurality of input utterances and the selected paraphrases.

9. The medium of claim 8, wherein the operations further comprise:
obtaining aggregated training data based on stored user-agent dialogs, the at least one of the one or more paraphrases, or the stored user-agent dialogs and the at least one of the one or more paraphrases, wherein the paraphrase model is trained using the aggregated training data.

10. The medium of claim 9, wherein the operations further comprise:
selecting, based on the aggregated training data, the paraphrase model from a plurality of paraphrase models.

11. The medium of claim 10, wherein a plurality of N-grams features are generated from the aggregated training data, selecting the paraphrase model comprises:
determining, based on the plurality of N-grams features, that the aggregated training data comprises new training data related to the paraphrase model, wherein the paraphrase model is updated based on the aggregated training data.

12. The medium of claim 9, wherein the operations further comprise:
generating a plurality of N-grams from the aggregated training data;
determining, based on the plurality of N-grams, that the aggregated training data is unrelated to any previously generated paraphrase model; and
generating the paraphrase model based on the aggregated training data.

13. The medium of claim 8, wherein the at least one of the one or more paraphrases selected is semantically equivalent to a corresponding input utterance.

14. The medium of claim 8, wherein the operations further comprise:
training, prior to the one or more paraphrases being obtained, the paraphrase model using training data, wherein the training data is obtained by:
  generating texts in a first language,
  translating the texts into one or more second languages based on machine translation to obtain translated texts,
  translating each of the translated texts from the one or more second languages to the first language to obtain re-translated texts, and
  generating the training data based on the texts in the first language and the re-translated texts.

15. A system, having at least one processor, storage, and a communication platform connected to a network for generating a conversational agent, comprising:
a paraphrase generator configured to obtain, based on a paraphrase model, one or more paraphrases for each of a plurality of input utterances, wherein the paraphrase model is trained to obtain the one or more paraphrases via machine translation of the plurality of input utterances;
a paraphrase data selector configured to select at least one of the one or more paraphrases for each input utterance to generate selected paraphrases, wherein the selecting is based on:
  a user instruction of selecting the at least the one of the one or more paraphrases, and
  an intent of the input utterance; and
a conversational agent generator configured to generate a conversational agent based on the plurality of input utterances and the selected paraphrases.

16. The system of claim 15, further comprising:
a training data aggregator configured to obtain aggregated training data based on stored user-agent dialogs, the at least one of the one or more paraphrases, or the stored user-agent dialogs and the at least one of the one or more paraphrases, wherein the paraphrase model is trained using the aggregated training data.

17. The system of claim 16, further comprising:
a paraphrase model selector configured to select, based on the aggregated training data, the paraphrase model from a plurality of paraphrase models.

18. The system of claim 17, wherein a plurality of N-grams features are generated from the aggregated training data, the paraphrase model being selected comprises the paraphrase model selector being configured to:
determine, based on the plurality of N-grams features, that the aggregated training data comprises new training data related to the paraphrase model, wherein the paraphrase model is updated based on the aggregated training data.

19. The system of claim 16, further comprising:
a paraphrase model selector configured to:
  generate a plurality of N-grams from the aggregated training data, and
  determine, based on the plurality of N-grams, that the aggregated training data is unrelated to any previously generated paraphrase model; and
a statistical paraphrase model training engine configured to generate the paraphrase model based on the aggregated training data.

20. The system of claim 15, further comprising:
a machine translation based training data collector configured to train, prior to the one or more paraphrases being obtained, the paraphrase model using training data, wherein the training data is obtained by:
  generating texts in a first language,
  translating the texts into one or more second languages based on machine translation to obtain translated texts,
  translating each of the translated texts from the one or more second languages to the first language to obtain re-translated texts, and
  generating the training data based on the texts in the first language and the re-translated texts.

* * * * *